United States Patent
Nakanishi et al.

(10) Patent No.: US 6,351,382 B1
(45) Date of Patent: Feb. 26, 2002

(54) COOLING METHOD AND DEVICE FOR NOTEBOOK PERSONAL COMPUTER

(75) Inventors: Tohru Nakanishi, Moriyama; Yasuharu Yamada, Shiga-ken; Masanori Kuzuno, Ohtsu; Toshihiko Nishio, Moriyama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,565

(22) Filed: Mar. 22, 2000

(30) Foreign Application Priority Data

Mar. 25, 1999 (JP) ............................................. 11-081688

(51) Int. Cl.[7] ................................................. H05K 7/20
(52) U.S. Cl. .................... 361/700; 361/690; 361/695; 361/697; 361/719; 361/720; 174/15.2; 174/16.3; 165/80.3; 165/80.4
(58) Field of Search ................................. 361/687, 694, 361/695, 700, 704, 709, 710; 165/80.2, 80.3, 185, 104.33; 174/15.2, 16.3

(56) References Cited

U.S. PATENT DOCUMENTS

| | | | |
|---|---|---|---|
| 5,339,214 A | * | 8/1994 | Nelson ........................ 361/695 |
| 5,637,921 A | * | 6/1997 | Burward-Hoy .............. 361/704 |
| 5,756,931 A | * | 5/1998 | Kitahara et al. ............. 361/709 |
| 5,966,286 A | * | 10/1999 | O'Connor et al. .......... 361/699 |
| 5,987,890 A | * | 11/1999 | Chiu et al. ................... 361/700 |
| 5,992,511 A | * | 11/1999 | Kodaira et al. ............. 165/80.3 |
| 6,043,980 A | * | 3/2000 | Katsui ......................... 361/695 |
| 6,058,009 A | * | 5/2000 | Hood, III et al. ........... 361/687 |
| 6,122,167 A | * | 9/2000 | Smith et al. ................. 361/687 |
| 6,122,169 A | * | 9/2000 | Liu et al. ..................... 361/700 |
| 6,125,035 A | * | 9/2000 | Hood, III et al. ........... 361/687 |
| 6,137,681 A | * | 10/2000 | Lu .............................. 361/697 |

* cited by examiner

Primary Examiner—Leo P. Picard
Assistant Examiner—Boris L. Chervinsky
(74) Attorney, Agent, or Firm—Andrew J. Dillon

(57) ABSTRACT

A cooling device has a heat sink for transferring a portion of heat generated by a heat generating component to a position different from the position of the heat generating component by heat conduction, a heat pipe for forcibly transferring at least a portion of the rest of the heat generated by the heat generating component to a position different from the position of the heat generating composition, and a forced-heat-radiating means for forcibly radiating the transferred heat from the heat radiating means.

3 Claims, 6 Drawing Sheets

COOLING METHOD AND DEVICE FOR NOTEBOOK PERSONAL COMPUTER

BACKGROUND OF THE INVENTION

1. Technical Field

The present invention relates to a cooling method and device for a notebook personal computer. More particularly, the invention relates to a method and a device for forced cooling of a heat generating component which generates a significant amount of heat.

2. Description of the Related Art

High performance notebook personal computers (hereinafter referred to as PCs) require high performance central processing units (hereinafter referred to as a CPUs). However, high performance electronic components such as CPUs generate a significant amount of heat during operation, which degrades its processing speeds and performance. For this reason, high temperature, heat generating components such as CPUs have been provided with cooling means.

Means for cooling a high-temperature heat generating component is designed in response to a temperature generated by the component. Specifically, when the heat generating component generates extremely low heat, it is air-cooled without using any cooling component. When the heat generating component generates relatively low heat, it is air-cooled by using a heat sink or a heat pipe. Alternatively, when the heat generating component generates a significant amount of heat, it is forcibly cooled by using a fan motor, or by using both a Peltier device and a fan motor. However, in today's high performance notebook PCs, it is impossible to air-cool a heat generating component that generates a large amount of heat. Therefore, such heat generating components are forcibly cooled in almost all high-performance notebook PCs.

One example of a method of forced cooling of a heat generating component is shown in FIG. 8 and FIG. 9. In FIG. 8, a heat sink 3 with fins and the like is stacked on a heat generating component 2 such as a CPU mounted on a substrate 1, and the component 2 is forcibly cooled by a fan motor 4. In FIG. 9, a heat sink 3 with fins and the like is stacked on a heat generating component 2 such as a CPU mounted on the substrate 1 through a Peltier device 5, and the component 2 is forcibly cooled by a fan motor 4. In FIG. 9, the Peltier device 5 may produce higher heat-radiating effect than in the FIG. 8. Such forced-cooling methods shown in FIG. 8 and FIG. 9 have been adopted in desktop PCs.

However, if the above cooling methods used in desktop PCs is adopted to notebook PCs, the following three serious problems will arise:

1. Height limitations. The height of a notebook PC is required to be as low as possible in terms of portability and operability. Therefore, the height of a notebook PC should not be determined by the design of a cooling device, and as a matter of course, a cooling device should be designed to be lower than the heights of the other functional components. However, since the height of a notebook PC can not be increased any more, no additional space for a cooling device is left in the notebook PC.
2. Power consumed during cooling. A large amount of power is needed to operate a fan motor and a Peltier device, and the power applied to the fan motor and the Peltier device is obtained from the power source for activating the other functional components. For this reason, when a battery is used, continuous operation period of power is dramatically shortened.
3. When a Peltier device is used, it is necessary to supply power to the Peltier device and the fan motor continuously. In other words, if the Peltier device is not operated, it gives a significant amount of heat resistance, and thus it does not function as a cooling device at all. Therefore, when the battery is used, continuous operation period of power is dramatically shortened.

In the prior art, Japanese Patent Publication No. 10-107469 discloses a cooling device comprising a heat conductive member, one end of which is connected to a heat generating component; a heat radiating member connected to the other end of the heat conductive member; and air guiding means for transmitting air to the surroundings of the heat radiating member. It discloses that the heat conductive member is a heat pipe, the heat radiating member comprises fins, and the air guiding means is equipped with a fan, however, it does not mention or indicate that the cooling device may have other structures.

In the future, faster and higher performance CPU will be mounted on a notebook PC which will generate more heat during operation. Since the above-mentioned conventional cooling device lacks ability of cooling a high temperature heat generating component or reaches to the upper limit of its height, there is a need to develop new and improved cooling devices.

SUMMARY OF THE INVENTION

A cooling method and device for a notebook PC uses the following steps: transferring a portion of heat generated by a heat generating component of a notebook PC to a position different from the position of the heat generating component by heat conduction; forcibly transferring at least a portion of the rest of the heat generated by the heat generating component to a position different from the position of the heat generating component; and forced cooling of the transferred heat. Other steps of the cooling method of the present invention include: transferring heat generated by a heat generating component of a notebook PC to a position different from the position of the heat generating component; cooling the transferred heat by using thermomodule device; and cooling a higher temperature side of the thermomodule device by air flow. In this cooling method, the heat generated by the heat generating component is forcibly cooled in a position different from the position of the heat generating component disposed to a notebook PC. As the way of transferring heat generated by the heat generating component, thermal conduction by a heat sink or forced heat transfer by a heat pipe, a thermomodule device and/or a circulating liquid such as water may be used. Preferably, the transferred heat is absorbed by the thermomodule device and is ejected to the outside by air flow.

The cooling device of the present invention comprises: a heat sink for thermally conducting a portion of the heat generated by the heat generating component of a notebook PC to a position different from the position of the heat generating component; heat transferring means of forcibly transferring at least a portion of the rest of the heat generated by the heat generating component to a position different from the position of the heat generating component; and heat radiating means for forcibly radiating the transferred heat from the heat transferring means. The heat transferring means may comprise a heat pipe, a thermomodule device such as a Peltier device, and/or a cooler comprised of a tube through which coolant is circulated. The forced heat radiating means may comprise a fan or blower for dissipating heat of the heat transferring means to the outside by applying air blow and air suction. In this cooling device, the heat generated by the heat generating component can be transferred to a position different from the position of the heat generating component and then cooled powerfully in that position. Therefore, the height of a notebook PC ( i.e. the thickness of a notebook PC) is not increased, but the ability to radiate heat can be dramatically enhanced. Furthermore, since a thermomodule device and/or an air blower is controlled on the basis of a temperature of the heat generating component, it is possible to self-control the cooling ability and to minimize the power consumption.

An object of the present invention is to efficiently cool a high temperature heat generating component such as a CPU without increasing the height of a personal computer.

Another object of the present invention is to efficiently cool a heat generating component while power consumption for a cooling device is saved.

An object of the present invention is to efficiently cool a high-temperature heat generating component such as a CPU without increasing height of a personal computer.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Embodiments of the cooling method and the cooling device for a notebook PC are described below with reference to the accompanying drawings.

Figure 1:
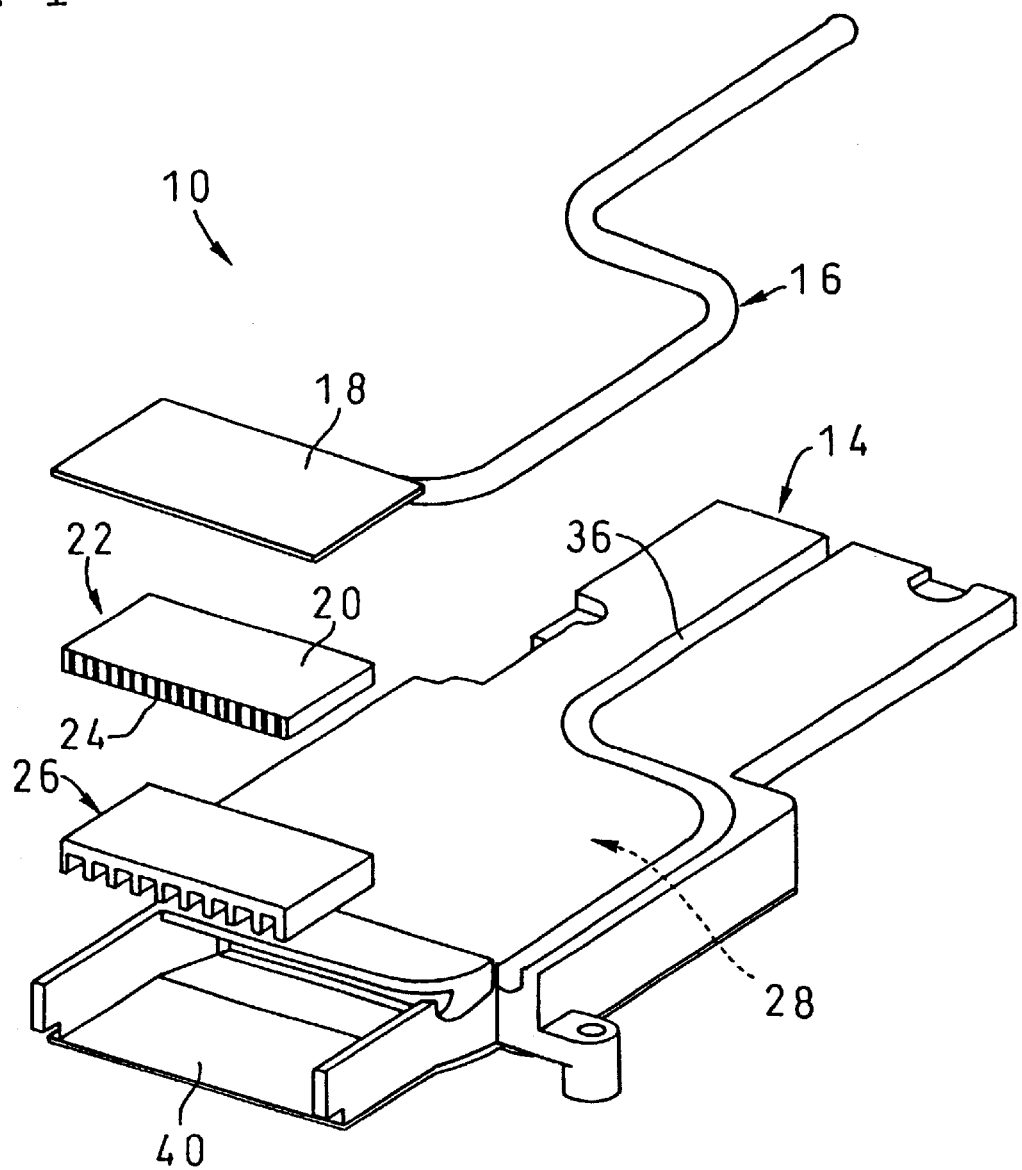
FIG. 1 is an exploded view showing an embodiment of a cooling device for a notebook PC according to the present invention.
Figure 2:
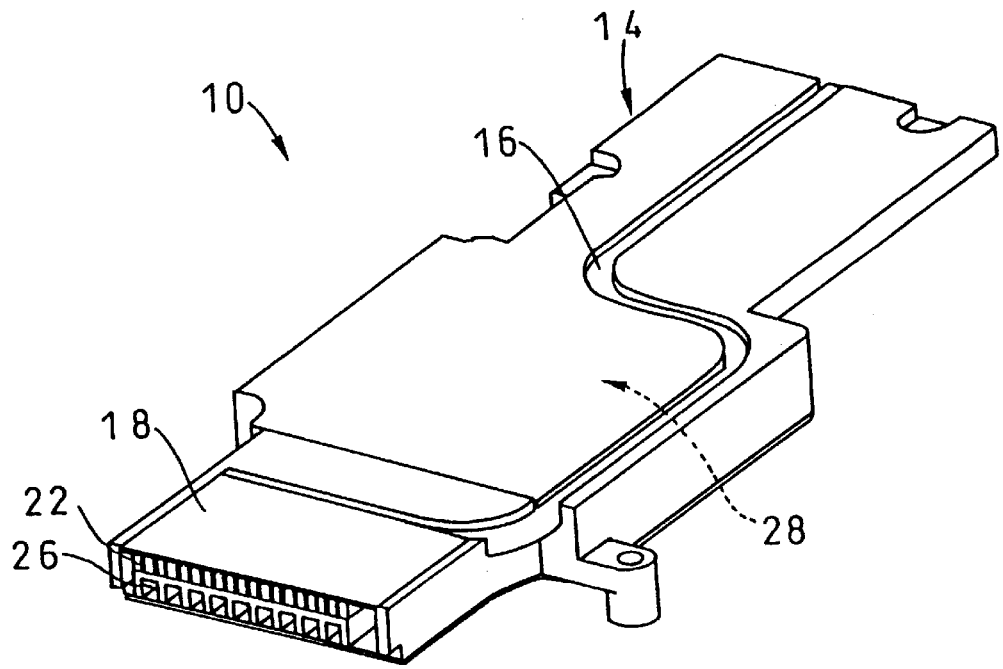
FIG. 2 is a perspective view showing t he cooling device for the notebook PC according to FIG. 1.
Figure 3:
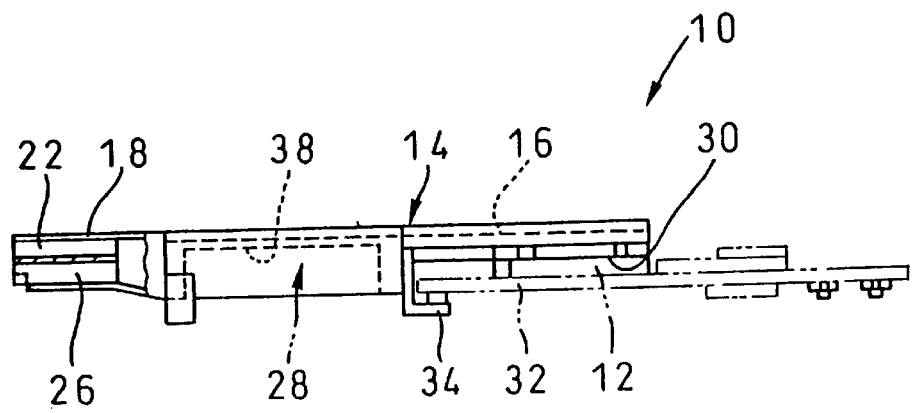
FIG. 3 is an elevational side view showing the cooling device for the notebook PC according to FIG. 1.

As shown in FIG. 1, 2 and 3, a cooling device 10 comprises: a heat sink 14 which is kept in contact with a heat generating component 12 of a notebook PC (see FIG. 3) and transfers heat generated by the component 12 to a position different from the position of the component 12 by heat conduction; a heat pipe 16 which is juxtaposed with the heat sink 14 and transfers heat of the heat generating component from one end to the other end which is a position different from the position of the heat generating component; a cooling plate 18 disposed on an end of the heat pipe 16; a thermomodule device 22 such as Peltier device whose heat absorbing surface (lower temperature side) 20 is kept in contact with the cooling plate 18; a fin member 26 which is provided with a number of fins and kept in contact with the heat radiating surface 24 (high temperature side) of the thermomodule device 22; and a fan or air blower 28 for producing air flow at least in the radiating fins of the fin member 26.

The heat generating component 12 disposed inside a notebook PC may be a CPU chip, a microprocessing unit (MPU) chip, or the like which may comprise some parts which degrade the operating speed and the performance of a notebook PC because those parts generate heat during operation and thus the generated heat decreases the operating speed. The upper surface of the heat generating component 12 is brought into contact with a heat absorbing surface 30 of the heat sink 14. The heat generating component 12 is disposed on a substrate 32. In order to make sure that the surface of the heat generating component 12 is brought into contact with the heat absorbing surface 30 of the heat sink 14, a fixture 34 is disposed on the back surface of the substrate 32, thus the substrate 32 is secured to the heat absorbing surface 30 by pressing screws and the like. Preferably, the heat sink 14 consists of material with excellent heat conductivity such as copper, aluminum or a composite thereof, and more preferably, it consists of material with an excellent ability to accumulate the heat.

The heat sink 14 is shaped like a generally flat plate as a whole. The heat absorbing surface 30 of the heat sink 14 is in contact with the heat generating component 12, and the other surface of the heat sink 14 has a groove 36 to dispose the heat pipe 15 in it. A cavity 38 is formed adjacent to the heat absorbing surface 30 to accommodate an air blower 28 and a motor therefor, and an outlet 40 for ejecting air is formed adjacent to the cavity 38. The groove 36 for disposing the heat pipe 16 in it is to transfer heat absorbed from the surface 30 efficiently to the heat pipe 16. Therefore, it is preferred to fill a filling material having excellent heat conductivity between the groove 36 and the heat pipe 16.

A part of heat transferred to the surface 30 of the heat sink 14 is transferred to the outlet's side of the heat sink 14 by heat conduction and most of the rest of the heat is transferred to the heat pipe 16 through the heat sink 14. As is well known, the heat pipe 16 comprises a sealed metal tube including a small amount of volatile liquid. When one end of the heat pipe receives heat, the one end of the sealed tube is cooled by heat of vaporization of the liquid; the generated vapor is transferred to the other end of the tube and then liquefied by radiating the heat; the generated liquid is transferred to the one end of the tube. Thus the liquid is circulated in the heat pipe 16. The heat pipe 16 is not particularly limited, therefore, any conventional heat pipe can be used as the heat pipe 16 of the present invention. When one end of the heat pipe 16 on the side of heat absorbing surface 30 is heated, it is cooled by the vaporization of liquid inside the pipe. At the same time, the vaporized gas is transferred to the other end, and then it is liquefied by radiating heat. On the other end of the heat pipe, a cooling plate 18 is disposed to promote the heat radiation of the other end of the pipe. The cooling plate 18 used herein is made of material with excellent heat conductivity such as copper or aluminum.

A thermomodule device such as a Peltier device and the like is disposed such that it is kept in contact with the cooling plate 18 disposed on the other end of the heat pipe 16. By applying a voltage to the thermomodule device, one side of the thermomodule device turns to the heat absorbing side 20, and the other side turns to the heat radiating side 24. A specific structure of the thermomodule device 22 is not particularly limited, however, a device whose heat absorbing side (lower temperature side) has as low temperature as possible, and especially a device which can cool the heat pipe to a temperature less than the liquefying temperature of the gas inside the heat pipe 16 are selected. The heat absorbing surface 20 of the thermomodule device 22 is kept in contact with the cooling plate 18, and the heat radiating surface 24 is kept in contact with the fin member 26. Therefore, when the thermomodule device. 22 is operated, the temperature of the surface 20 is reduced and then the other end of the heat pipe 16 is cooled through the cooling plate 18. On the other hand, the fin member 26 is disposed in contact with the heat radiating surface 24 (higher temperature side) of the thermomodule device 22, and the heat is dissipated to the outside air through the heat radiating fins of the fin member 26. The member 26 is made of material with excellent heat conductivity such as aluminum and the like, and includes a lot of strip-like or cylindrical fins so as to increase a contact surface with air but not to interfere with the air flow.

Further, the air blower 28 is provided to promote the heat radiation by the heat radiating fins of the member 26. The air blower 28 may comprise an axial fan flow fan. The axial flow fan takes in air in the direction of the rotation axis for supply to the cavity 38 in the heat sink 14, and sends the air toward the outlet 40. In addition, the motor for driving the axial flow fan is disposed in the center of the cavity 38, that is, the center of the axial fan. By driving the air blower 28, air flow is generated around the fins 26, so that the fins 26 and the inside surface of the heat sink 14 (on the side of the outlet 40) can be cooled. As the result, since the temperature gradient is generated between the side of the outlet 40 and the side of the surface 30 in the heat sink 14, the heat sink itself is cooled by the heat conduction.

Preferably, the operations of the thermomodule device 22 and the air blower 28 are controlled by a temperature sensor and a control means. Specifically, the temperature sensor is disposed on the surface 30 of the heat sink 14, and the operations of the thermomodule device 22 and the air blower 28 are controlled by the control means on the basis of a sensed temperature. Preferably, the operations of the thermomodule device 22 and the air blower 28 are controlled separately.

Figure 4:
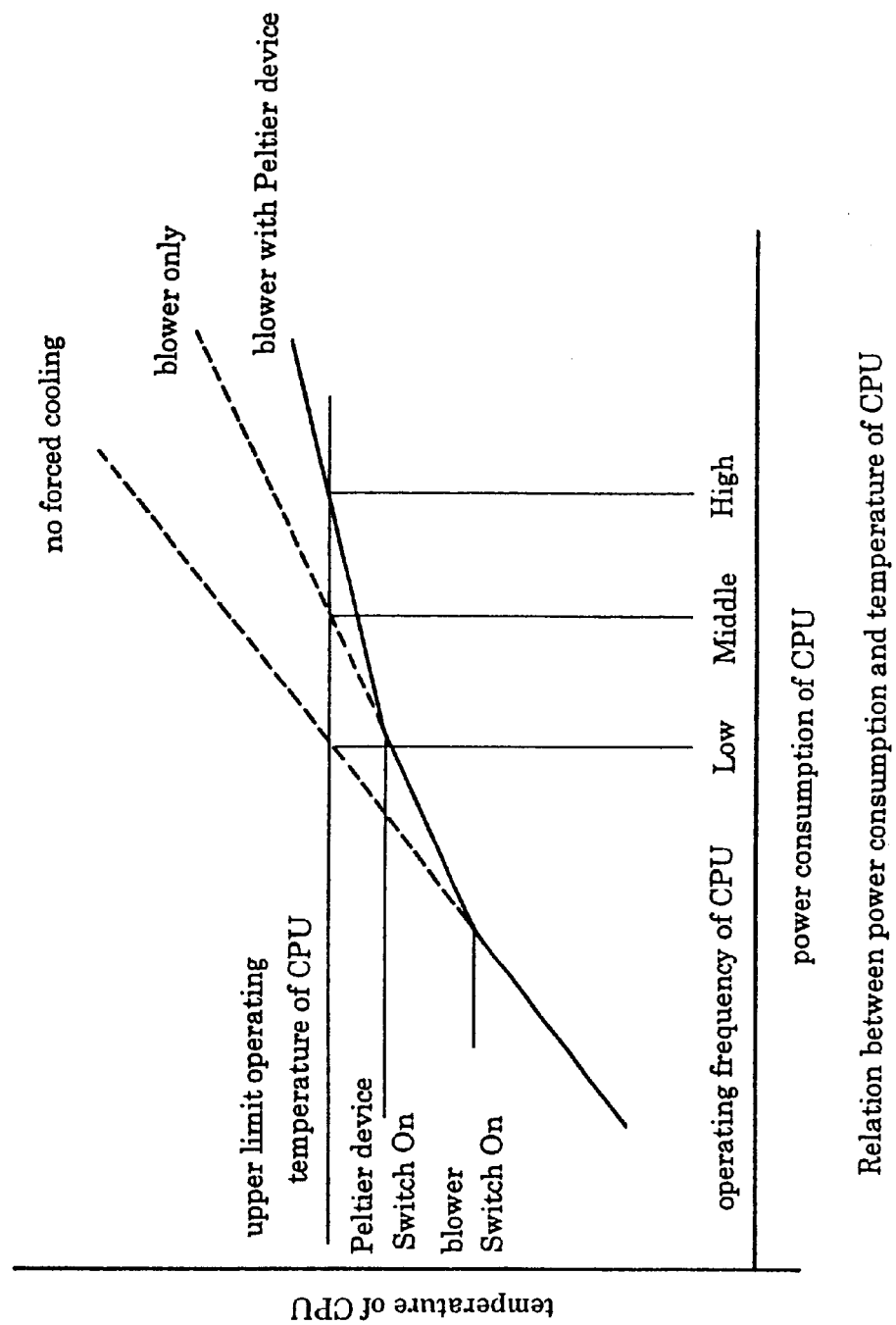
FIG. 4 is a plot showing the relationship between power consumption for a CPU and temperature.

Power consumption of the component 12 such as CPU is not always constant, but it varies depending on what it is used for or how it is used. FIG. 4 shows a relationship between power consumption and temperature of the component 12. The performance of the component 12 increases with the frequency, and at the same time power consumption (Low→Middle→High) also increases with frequency. Therefore, temperature of the component 12 is controlled so as not to exceed the upper limit of the operating temperature by sensing a temperature of the heat generating component 12 and by controlling on-off switching operations of the air blower 28 and the thermomodule device 22.

In the cooling device 10 of the above-mentioned notebook PC, the heat absorbing surface 30 of the heat sink 14 is brought into contact with the component 12, so that the heat generated by the component 12 can be transferred to the heat sink 14. When the amount of heat generated from the component 12 is little, the component 12 can be cooled only by the heat capacity and the natural heat radiation of the heat sink 14. As the heat amount of the component 12 increases, the one end of the heat pipe 16 is heated, whereby a portion of the heat is transferred to the other end and substantial portion of the rest of the heat is transferred through the heat sink itself to the outlet 40. When the temperature sensor senses that the temperature of the surface 30 exceeds a predetermined value, the air blower 28 is operated by the control means, and then the outlet's side of the heat sink 14 is cooled. As the result, the temperature gradient in the heat sink 14 increases, so that cooling by heat conduction and the heat transfer by the heat pipe 16 can be promoted.

When the amount of heat and the temperature of the component 12 further increases, the thermomodule device 22 is activated by the control means. Then, one end of the heat pipe 16 is forcibly cooled through the cooling plate 18. In the meanwhile, the fin member 26 in contact with the heat radiating surface 24 of the thermomodule device 22 is forcibly cooled by applying the air blow, therefore, the cooling effect by the thermomodule device 22 can be enhanced.

When the temperature of the component 12 falls due to the termination of the operation of the notebook PC, the operation of the thermomodule 22 is stopped by the control means on the basis of a temperature sensed by the temperature sensor. In addition, when the temperature of the component 12 is lowered, the operation of the air blower 28 is also stopped.

Thus, the thermomodule element 22 is not located directly on the surface of the component 12, but it is located in a position different from the position of the component 12 through the heat sink 14. Therefore, the height of the cooling device 10 is not increased, so that the height of the notebook PC itself is not determined by the height of the cooling device. In addition, since the thermomodule device 22 is not disposed directly on the surface of the component 12, it is not necessary to provide power continuously to the thermomodule device 22 and the air blower 28 all the time. Therefore, power can be effectively saved and particularly, continuous operation period of power when the battery is used can be extended.

A preferred embodiment of the cooling method and the cooling device for a notebook PC according to the present invention has thus been described, however, it should be understood that the present invention is not limited to the above.

Figure 5A:
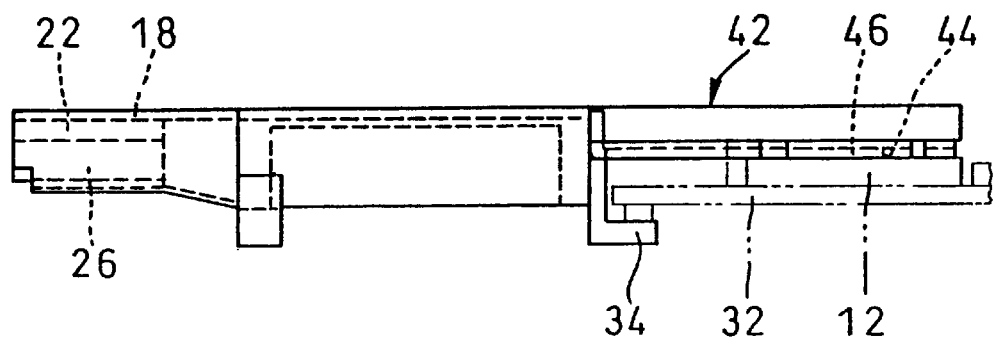
FIG. 5($a$) is an elevational side view and FIG. 5($b$) is a perspective view each showing another embodiment of the cooling device for a notebook PC according to the present invention.
Figure 5B:
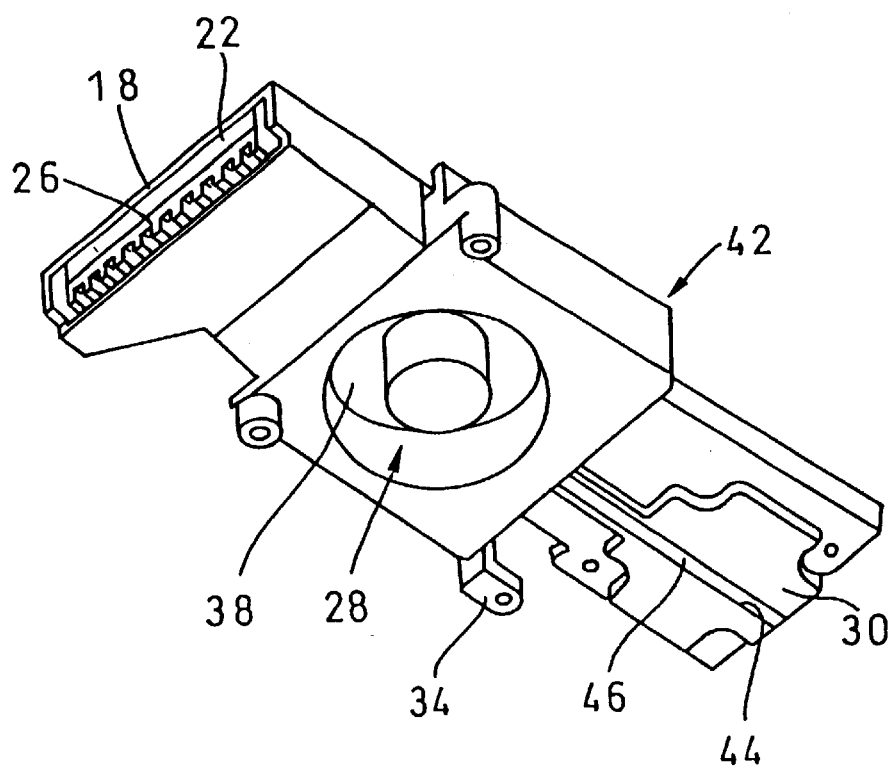

For example, as shown in FIG. 5(a) and 5(b), the groove 44 can be formed on the heat absorbing surface 30 of the heat sink 42 which is brought into contact with the component 12, and a heat pipe 46 can be disposed in the groove 44. In this structure, since the heat pipe 46 is brought into direct contact with the component 12 and the heat of the component 12 is transferred more efficiently, the component 12 can be rapidly cooled. In addition, since the component 12 is also kept in contact with the surface 30 of the heat sink 42, the component 12 can also be cooled through the surface 30.

Figure 6:
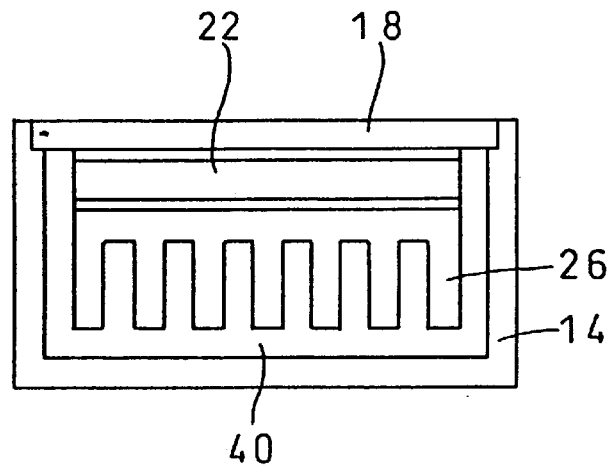
FIG. 6 is an enlarged front view showing another embodiment of the cooling device for a notebook PC according to the present invention.

Further, as shown in FIG. 6, it is preferred that the thermomodule device 22, which is disposed in the outlet 40 of the heat sink 14, and the fin member 26 is fixed to the cooling plate 18 and heat isolation is provided between the fin member 26 and the heat sink 14. The heat isolation may be obtained by either providing clearance between them so as not to contact with each other (see FIG. 6), or providing an insulating material between them. Either method can be used. Thus, by providing heat isolation between the fin member 26 and the heat sink 14, the heat transferred to the fin member 26 is not transferred back to the heat sink 14.

Figure 7:
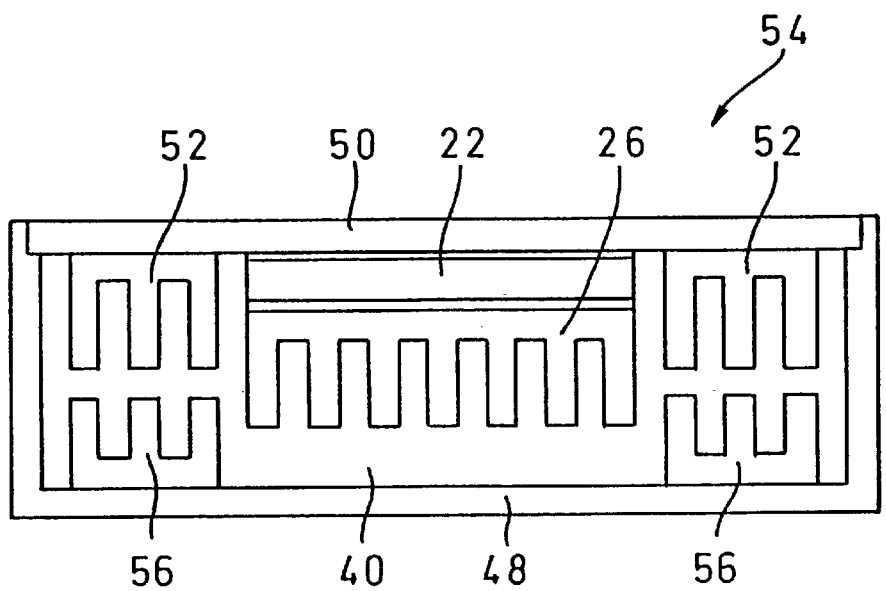
FIG. 7 is an enlarged front view showing still another embodiment of the cooling device for a notebook PC according to the present invention.
Figure 8:
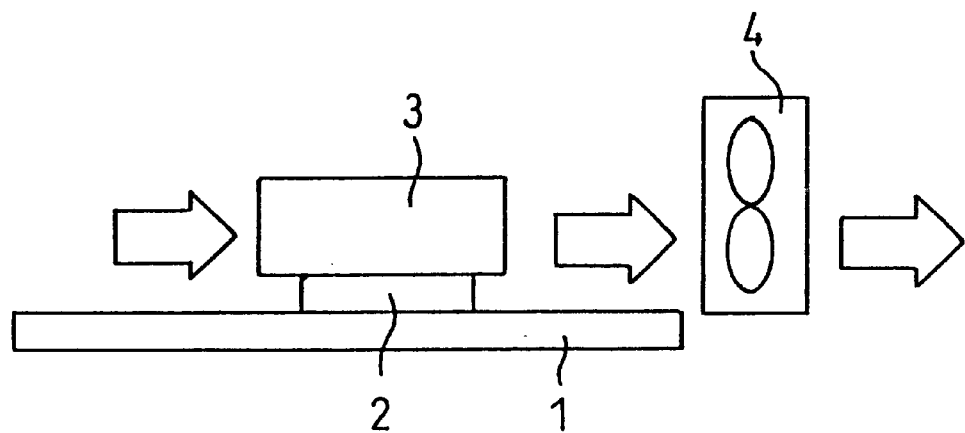
FIG. 8 is a conceptual drawing of an example of a cooling device for a conventional notebook PC.
Figure 9:
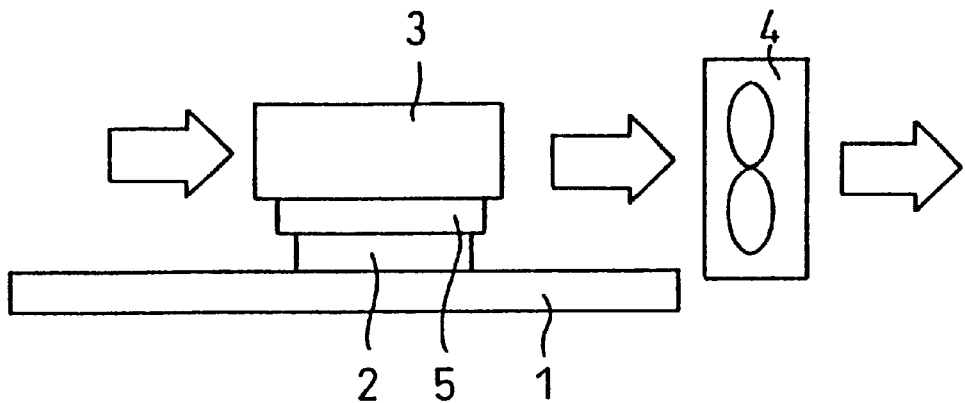
FIG. 9 is a conceptual drawing of another example of a cooling device for a conventional notebook PC.

Further, a cooling device 54 as shown in FIG. 7 is possible, wherein the thermomodule device 22, which is disposed in the outlet 40 of the heat sink 48, and the fin member 26 is fixed to a cooling plate 50, while additional fin members 52 are attached directly to the cooling plate 50. In this structure, since air flow is also sent to the fin members 52 by the air blower (not shown), the cooling plate 50 can be rapidly cooled. Therefore, the activation of the thermomodule device 22, which consumes lots of power, can be delayed, thus continuous operation period of power when the battery is used can be extended.

As shown in FIG. 7, the fin members 56 can be attached to the heat sink 48. A portion of the heat generated by the component 12 is thermally conveyed through the heat sink 48. Heat dissipation by the fin members 56 further increases the heat gradient in the heat sink 48, thereby prompting the heat conduction.

Based on the accompanying drawings, preferred embodiments of the cooling method and the cooling device for a notebook PC according to the present invention have been described above. However, it should be understood that the present invention is not limited to the illustrated ones.

For example, the cooling of the heat generating component can be promoted by convection or circulation of coolant such as water, which is contained in or flows through a cavity in the heat sink. Further, a cooler which is comprised of a tube through which a coolant is circulated can be used with the heat pipe or instead of the heat pipe. The coolant can be circulated by using a pump, however, the coolant is preferably circulated by convection without using any energy.

In the above preferred embodiments, the heat of the heat generating component is forcibly transferred to a different position by using the heat pipe, however, the thermomodule device would also be used instead of the heat pipe. The heat absorbing part (lower temperature side) and the heat radiating part (higher temperature side) of the thermomodule device are separately disposed. In other words, the heat absorbing part is disposed on the heat generating component's side and the heat radiating part is disposed on the outlet's side (a position different from the position of the heat generating component).

In addition, the configuration of the heat sink is not limited to the illustrated ones, and the fan or air blower is not necessarily integrated into the heat sink. Further, the air blower is not limited to the axial flow fan type, but various kinds of fan can be used. For example, an air blower applying air suction to the heat radiating fins can be used in the present invention. Thus, it should be understood by those skilled in the art that various changes, modifications and improvements can be made thereto without departing from the spirit or scope of the present invention.

EXAMPLE

A Pentium II (266 MHz) was used as a CPU and it was operated under the atmosphere of 25 degrees C. to measure a temperature at the position where the CPU is mounted. When cooling is used, the temperature of the mounting position exceeded 100 degrees C. When the heat sink 14, the heat pipe 16, and the air blower 28 were used to cool the CPU as shown in FIG. 1, the temperature at the mounting position was 72 degrees C. Next, in addition to the heat sink 14, the heat pipe 16 and the air blower 28, a Peltier device was used as a thermomodule device 22, as shown in FIG. 1. The Peltier device 22 and the air blower 28 were operated, and the Peltier device 22 was cooled by the air blower 28 through the fin member 26. In that case, the temperature of the mounting position was 67 degrees C.

The invention has several advantages. The cooling method and the cooling device for a notebook PC according to the present invention transfers heat generated by a heat generating component such as a CPU and the like to a position different from the position of the heat generating component through a heat sink and heat transferring means such as a heat pipe and dissipates the transferred heat rapidly by forced-heat-radiating means in that position. Therefore, effective cooling can be achieved without increasing the height of the notebook PC in accordance with the design of a cooling device.

Since the thermomodule device is not attached directly to the heat generating component but the heat sink and/or the heat transferring means which does not need supplying with power are attached to the heat generating component, it is not necessary to supply power continuously. Therefore, only when the forced cooling is needed, power is supplied to the forced heat transferring means, and thus power consumption can be minimized.

While the invention has been shown or described in only some of its forms, it should be apparent to those skilled in the art that it is not so limited, but is susceptible to various changes without departing from the scope of the invention.

What is claimed is:

1. A cooling device for a notebook personal computer, comprising:

a heat sink in contact with a heat generating component which transfers heat generated by the heat generating component to a first position different from a position of the heat generating component by heat conduction;

a heat pipe which is juxtaposed with and has one end mounted to the heat sink and transfers heat of the heat generating component from said one end of the pipe to an opposite end of the pipe, at a second position different from the position of the heat generating component;

a cooling plate disposed on the opposite end of said heat pipe;

a thermomodule device having a heat absorbing part kept in contact with said cooling plate;

a heat-radiating fin member kept into contact with a heat radiating part of said thermomodule device; and an air blower for applying an air stream at least to said heat radiating fins.

2. The cooling device for a notebook personal computer according to claim 1, further comprising:

a sensor for sensing a temperature of said heat generating component; and control means for controlling the thermomodule device and the air blower based on the temperature sensed by the sensor.

3. A cooling method for a notebook personal computer, comprising the steps of:

transferring heat generated by a heat generating component of a notebook personal computer to a position that is different from a position of the heat generating component;

cooling the transferred heat by using a thermomodule device; and cooling a high temperature side of the thermomodule device by air flow; wherein said step of transferring heat generated by the heat generating component of the notebook PC to the position that is different from the position of the heat generating component comprises the steps of:

transferring a portion of heat generated by the heat generating component of the notebook PC to a first position that is different from the position of the heat generating component by heat conduction; and forcibly transferring at least a portion of a remainder of the heat generated by the heat generating component to a second position that is different from the position of the heat generating component.

* * * * *